Feb. 27, 1923.
J. BERLIEN
STEERING WHEEL LOCK FOR AUTOMOBILES
Filed June 1, 1920
1,447,010
2 sheets-sheet 1
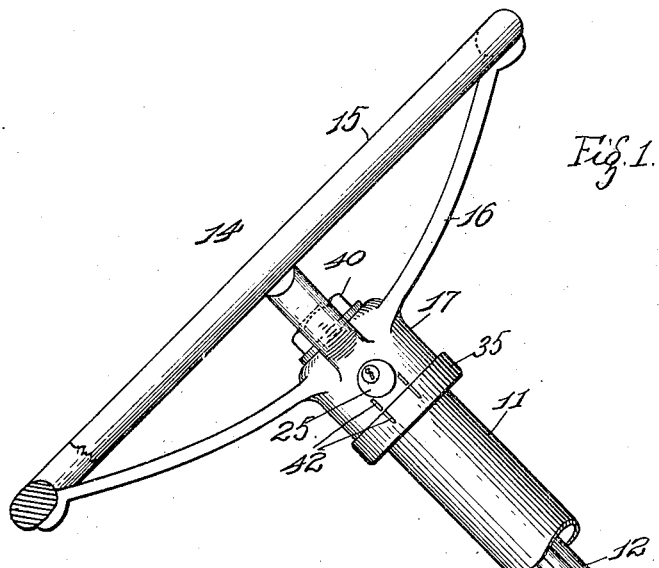
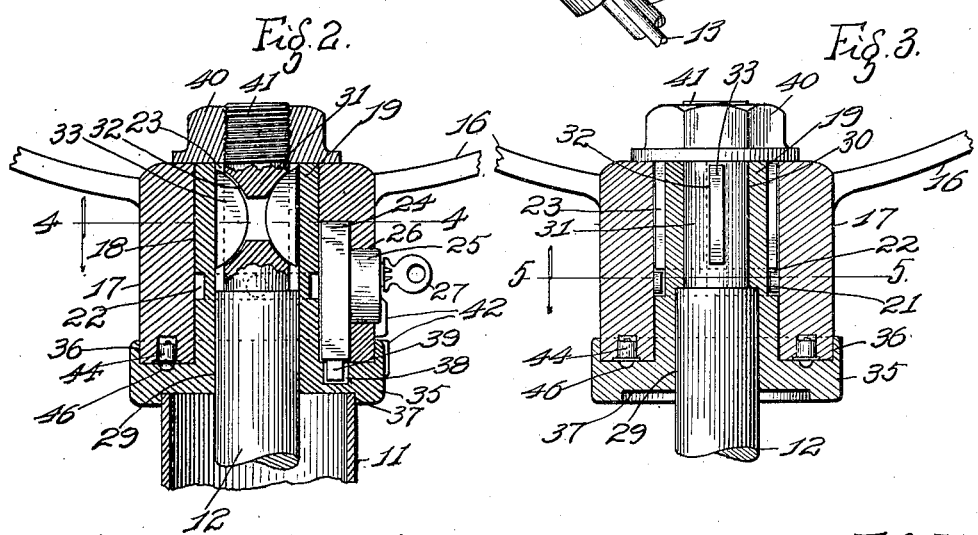
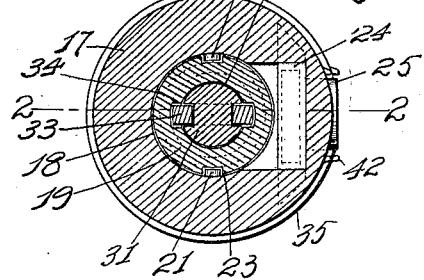
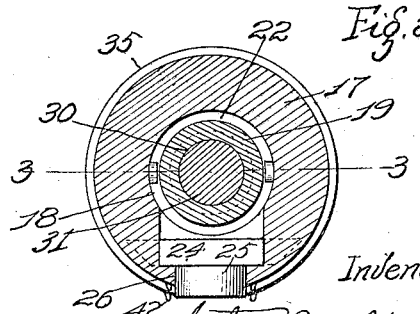
Inventor.
John Berlien Feb. 27, 1923.
J. BERLIEN
1,447,010
STEERING WHEEL LOCK FOR AUTOMOBILES
Filed June 1, 1920
2 sheets-sheet 2
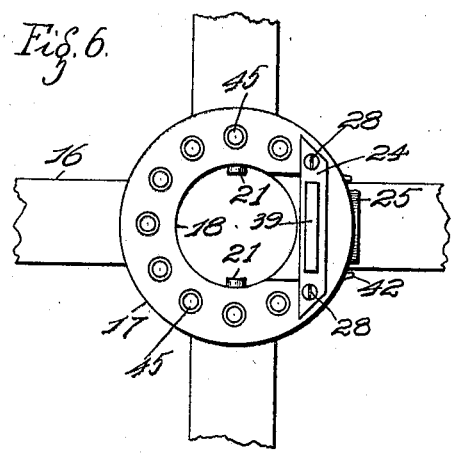
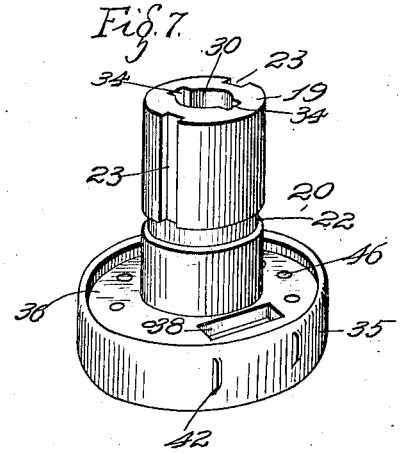
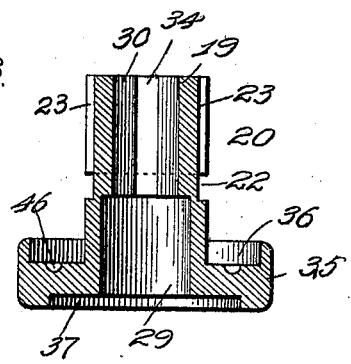
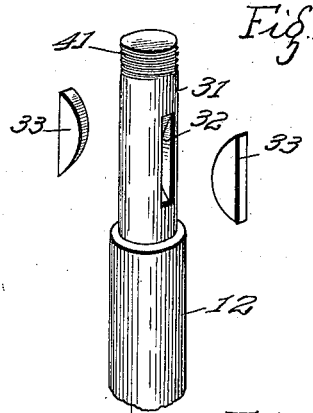
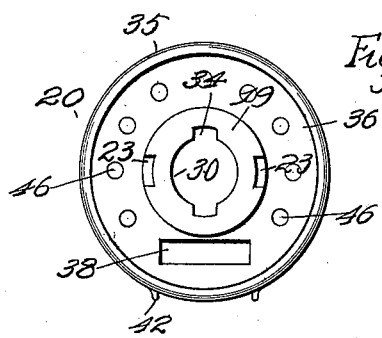
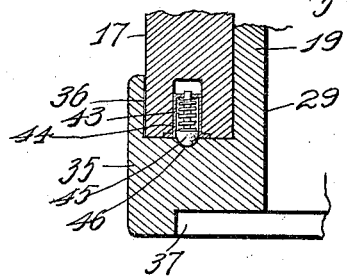
Inventor.
John Berlien Patented Feb. 27, 1923.

1,447,010

UNITED STATES PATENT OFFICE.

JOHN BERLIEN, OF ST. LOUIS, MISSOURI.

STEERING-WHEEL LOCK FOR AUTOMOBILES.

Application filed June 1, 1920. Serial No. 385,421.

*To all whom it may concern:*

Be it known that I, JOHN BERLIEN, a citizen of the United States, and resident of St. Louis, Mo., have invented certain new and useful Improvements in a Steering-Wheel Lock for Automobiles, of which the following is a specification.

This invention relates to improvements in a steering wheel lock for automobiles, and has for its object a mechanism attached to the upper end of the steering post to which is attached the steering wheel, and a lock carried by the hub casing of the steering wheel which when in locked position will permit the wheel to operate the steering post and when in unlocked position will permit the wheel to freely move without in any way operating the steering post or any part of the steering mechanism.

A further object is to place an attachment on the upper end of the steering rod without in any way affecting the working mechanism of the machine or without detaching any parts but merely placing in addition the locking feature.

Figure 1, is a side view of the upper portion of the steering wheel showing the application of my invention.

Fig. 2, is a sectional view of the same taken on the line 2—2 of Fig. 4.

Fig. 3, is a sectional view of the same taken on the line 3—3 of Fig. 5.

Fig. 4, is a horizontal sectional view taken on the line 4—4 of Fig. 2.

Fig. 5, is a horizontal sectional view taken on the line 5—5 of Fig. 3.

Fig. 6, is a bottom plan view of the hub casing detached from the rest of the mechanism.

Fig. 7 is a detail perspective view of the hub made use of and which is attached to the steering post.

Fig. 8, is a central sectional view of the hub.

Fig. 9, is a top plan view of the hub.

Fig. 10, is a detail perspective view of the upper end of the steering rod showing the mechanism by which it is locked in the hub.

Fig. 11, is an enlarged detail sectional view of a portion of the hub and hub casing showing the application of the spring catches made use of.

In describing my invention in detail 11 indicates an ordinary steering column, 12 the steering post, and in the column on each side of the post is located a lead rod and a throttle rod 13. These parts referred to being a part of the ordinary steering mechanism on all automobiles.

On the upper end of these parts is located the steering wheel 14 which comprises the ordinary rim 15 and the spider 16, which terminates to a hub casing 17. This hub casing is of ordinary tubular construction and the same is provided with a central bore 18, of a size sufficient to snugly fit over the cylindrical projection 19 of the hub 20.

On the inner surface of the bore 18 is formed a pair of projections or lugs 21. These lugs are designed to operate in the circumferential groove 22 formed in the periphery of the cylindrical projection 19 of the hub; and aids in preventing the steering wheel portion from being lifted out of position except when the two lugs are in direct alignment with the longitudinal grooves 23 formed in the sides of the cylindrical projection, and extending from the top down to the circumferential groove.

In the hub casing and seated in a suitable mortise formed therein is an ordinary lock 24, the same provided with a tumbler barrel 25, projecting through a bore 26 formed in the side of the hub casing and into this tumbler barrel is inserted the key 27 by which the lock is operated. This lock is held in position when once inserted by means of the screws 28.

The hub 20 is provided with a bore 29 and extends approximately one-half the distance of the cylinder projection and this bore then terminates into a reduced bore 30. This bore is so shaped as to accommodate the insertion of the upper portion of the steering post 12, which post is provided on its upper end with a reduced portion 31 which snugly fits into the reduced bore 30 of the hub and the remaining portion of the post will snugly fit into the bore 29 of the hub. The reduced portion 31 of the post is slotted out as that indicated by the numeral 32 and in the slot is placed the dogs 33, the rounded portion thereof when placed in the slot will then permit a reasonable portion of the dogs to project beyond the periphery of the post and when so seated and inserted in the reduced bore 30 of the hub they are permitted to slide in the longitudinal grooves 34 formed in the periphery of the bore 30. This then locks the hub in position so as to permit the post 12 to be operated.

The lower end of the hub is provided with an enlargement 35, the upper portion provided with a recess 36 of a size sufficient to permit the insertion of the lower end of the hub casing and the bottom is provided with a depression 37 which fits over the upper end of the steering column 11. In the enlargement 35 is also provided a depression 38 which may be either rectangular in form as shown or round and acts as a lock seat for the lock bolt 39 depending upon the kind of a lock used in the construction of the mechanism. When the hub and hub casing has been placed in position upon the upper end of the steering rod the same is held thereon by the wheel nut 40 which is attached to the screw threaded end 41 of the reduced portion 31 of the post.

On the outer periphery of the hub casing and also on the enlargement 35 of the hub I provide projections 42 which act as indicators to show when the two parts are in proper position for manipulating the lock and when the same is locked so that the locking bolt 39 is in the seat, it will then permit the steering wheel to operate the steering post and when it is desired to place the steering mechanism out of operation when it becomes desired to park the machine, the key is so turned in the lock as to raise the bolt out of the seat then the wheel will be permitted to freely rotate on the hub without operating the post.

The lugs 21 which project into the circumferential groove will prevent the hub casing from being removed from the hub except when brought in proper alignment with the longitudinal grooves 23.

The device is simple in construction comprising a hub connected to the steering post; a hub casing fitting over the hub, and a lock carried by the casing.

In the bottom of the hub casing and at suitable intervals apart I insert spring catches 43, the same being of the ordinary structure consisting of a housing 44, in which is supported a spring actuated catch 45, these catches are so arranged as to operate by friction and the heads of the catches when brought in alignment with depressions 46 formed in the surface of the hub extension will seat themselves therein and assist the locking feature. These catches however, will automatically operate by the movement of the hub casing on the hub.

Having fully described my invention what I claim is:

1. A lock of the character described comprising a mechanism supported on the upper end of a steering post, said mechanism comprising a cylindrical hub having a projecting flange base which is attached to said post, vertical and horizontal grooves formed in the periphery of the cylindrical hub, a hub casing forming part of the steering wheel arranged to fit over the hub projections formed on the inner surface of the casing and to project into the grooves formed in the hub; and a lock carried by the casing for locking the casing to the hub so that the steering rod may be operated by the manipulation of the steering wheel, substantially as specified.

2. A lock of the character described comprising a hub casing, a spider radiating therefrom, a rim attached to the end of the spider, a pair of lugs formed on the inner periphery of the hub casing, a hub inserted in the hub casing, a flanged enlargement formed on the bottom of the hub and in which the casing rests, a lock carried by the hub casing and designed to be brought in contact with the hub for locking the casing thereto in combination with the steering post to which the hub is firmly attached, substantially as specified.

3. A device of the class described comprising a steering wheel, having a hub casing, a lock carried thereby, a hub inserted in the hub casing, said hub having an integral enlarged flanged base, a pair of lugs formed on the hub casing for holding the same to the hub yet permit the same to move one upon the other; a lock for rigidly connecting the hub casing with the hub and a pair of dogs connecting the hub to the end of the steering post, substantially as specified.

4. A lock of the character described comprising in combination with the upper end of a steering post, of a hub made fast thereon, a channeled flange formed on the bottom of the hub, said flange having a depression for the reception of a lock latch, said hub provided with a pair of vertical grooves and a circumferential groove at the base of said vertical grooves, a hub casing placed over the hub and resting in the channeled flange, a pair of lugs formed on the inner periphery of the hub casing and designed to operate in the circumferential flange of the hub and a lock carried by the hub casing for locking the casing and the hub together when its latch is inserted in the depression, substantially as specified.

In testimony whereof, I have signed my name to this specification, in presence of two subscribing witnesses.

JOHN BERLIEN.

Witnesses:
ALFRED A. EICKS,
B. M. AUSTINE.